United States Patent
Wang et al.

(10) Patent No.: US 11,646,585 B2
(45) Date of Patent: *May 9, 2023

(54) METHODS, ELECTRONIC DEVICES, AND CHARGER APPARATUS FOR QUICK USB CHARGING

(71) Applicant: TEXAS INSTRUMENTS INCORPORATED, Dallas, TX (US)

(72) Inventors: Tao Wang, Shanghai (CN); Jiachuan Zhang, Beijing (CN); Junjie Mai, Beijing (CN); Yingling Sun, Tianjin (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 997 days.

This patent is subject to a terminal disclaimer.

(21) Appl. No.: 15/972,997

(22) Filed: May 7, 2018

(65) Prior Publication Data
US 2018/0254650 A1    Sep. 6, 2018

Related U.S. Application Data

(63) Continuation of application No. 14/562,920, filed on Dec. 8, 2014, now Pat. No. 10,014,703, which is a
(Continued)

(51) Int. Cl.
*H02J 7/00*    (2006.01)

(52) U.S. Cl.
CPC .......... *H02J 7/00034* (2020.01); *H02J 7/00* (2013.01); *H02J 7/00047* (2020.01)

(58) Field of Classification Search
CPC ...... H02J 7/0003; H02J 7/0004; H02J 7/0006; H02J 7/0008; H02J 7/0009; H02J 7/0011;
(Continued)

(56) References Cited

U.S. PATENT DOCUMENTS

| | | | |
|---|---|---|---|
| 6,946,817 B2 | 9/2005 | Fischer et al. | |
| 7,268,561 B2 | 9/2007 | Zhu | |

(Continued)

FOREIGN PATENT DOCUMENTS

| | | |
|---|---|---|
| CN | 101111020 | 1/2008 |
| CN | 101221546 | 7/2008 |

(Continued)

OTHER PUBLICATIONS

Search Report for European Patent Application No. 14899393.4, dated Oct. 23, 2018 (5 pages).
(Continued)

*Primary Examiner* — Edward Tso
*Assistant Examiner* — Aaron Piggush
(74) *Attorney, Agent, or Firm* — Ray A. King; Frank D. Cimino (57) ABSTRACT

USB charger apparatus and chargeable electronic devices are presented in which the device and charger use USB cable data lines to establish a bidirectional communications connection, and the charger provides charger capability information to a master controller of the electronic device via the communications connection. The device controller preferentially selects a fastest charging match between the charger capability information and device charging capability information, and sends configuration information through the communications connection to set the power supply level of the charger. The charger communicates power supply status information to the electronic device, and the device can reconfigure the charger power supply level accordingly.

18 Claims, 6 Drawing Sheets

Related U.S. Application Data continuation of application No. PCT/CN2014/083659, filed on Aug. 5, 2014.

(58) Field of Classification Search
CPC ...... H02J 7/0013; H02J 7/0029; H02J 7/0036; H02J 7/0044; H02J 7/0052; H02J 7/0073; H02J 7/00; H02J 7/00034; H02J 7/00047; G01F 1/266
USPC .......................... 320/103, 137, 107, 134, 157
See application file for complete search history.

(56) References Cited

U.S. PATENT DOCUMENTS

| | | | |
|---|---|---|---|
| 7,675,571 B2 | 3/2010 | Cheng et al. | |
| 7,895,385 B2 | 2/2011 | Raju | |
| 8,386,814 B2 | 2/2013 | Tom et al. | |
| 8,442,586 B2 | 5/2013 | Danis et al. | |
| 8,482,256 B2 | 7/2013 | Zhu et al. | |
| 8,610,397 B2 | 12/2013 | Purdy et al. | |
| 8,661,268 B2 | 2/2014 | Brooks et al. | |
| 8,717,044 B2 | 5/2014 | Sims et al. | |
| 9,201,480 B2 | 12/2015 | Fischbach | |
| 9,651,593 B2 | 5/2017 | Sims et al. | |
| 10,014,703 B2 * | 7/2018 | Wang ................. | H02J 7/00034 |
| 10,554,060 B2 * | 2/2020 | Li ............................ | H02J 7/00 |
| 2003/0122523 A1 * | 7/2003 | Kim ....................... | H02J 7/007 320/112 |
| 2005/0174094 A1 | 8/2005 | Purdy et al. | |
| 2007/0188132 A1 | 8/2007 | Hussain et al. | |
| 2009/0177906 A1 * | 7/2009 | Paniagua, Jr. ............ | G06F 1/26 713/340 |
| 2010/0070659 A1 * | 3/2010 | Ma ....................... | G06F 13/385 710/14 |
| 2011/0016334 A1 * | 1/2011 | Tom ....................... | G06F 1/266 713/300 |
| 2011/0016341 A1 | 1/2011 | Tom et al. | |
| 2011/0156640 A1 | 6/2011 | Moslifeghi | |
| 2011/0298426 A1 | 12/2011 | Hussain et al. | |
| 2012/0119696 A1 | 5/2012 | Picard | |
| 2013/0080797 A1 * | 3/2013 | Chen ...................... | G06F 1/266 713/300 |
| 2013/0290765 A1 | 10/2013 | Waters et al. | |
| 2013/0335007 A1 | 12/2013 | Ting | |
| 2014/0095899 A1 * | 4/2014 | Sultenfuss .............. | G06F 1/266 713/300 |
| 2014/0203762 A1 | 7/2014 | Kato et al. | |
| 2015/0137789 A1 | 5/2015 | Furtner | |
| 2015/0349561 A1 | 12/2015 | Berggren et al. | |
| 2015/0380935 A1 * | 12/2015 | Calhoun ................. | G06F 1/266 307/42 |
| 2016/0380935 A1 * | 12/2016 | Kopans ................. | H04L 51/063 709/206 |

FOREIGN PATENT DOCUMENTS

| | | |
|---|---|---|
| CN | 103618356 | 3/2014 |
| CN | 103944224 | 7/2014 |
| EP | 2381571 A2 | 10/2011 |
| EP | 2042864 A2 | 1/2012 |
| JP | 2011-234355 A | 11/2011 |
| JP | 2013-520724 A | 6/2013 |
| JP | 2014-102693 A | 6/2014 |
| KR | 1020110095443 | 3/2013 |
| WO | 2013006753 A1 | 1/2013 |

OTHER PUBLICATIONS

Universal Serial Bus 3.1 Specification, Hewlett-Packard Company, Intle Corporation, Microsoft Corporation, Renesas Corporation, ST-Ericsson, Texas Instruments, Revision 1.0, Jul. 26, 2013, 631 pgs. (Uploaded in 7 parts).

USB Battery Charging 1.2 Compliance Plan, Copyright 2011 USB Implementers Forum Inc., Revision 1.0, Oct. 12, 2011, 166 pgs. (Uploaded in 3 parts).

Battery Charging Specification, Copyright 2010 USB Implementers Forum Inc., Revision 1.2, Dec. 7, 2010, 71 pgs.

The I2C-Bus and How to Use it (Including Specifications), Phillips Semiconductors, Apr. 1995 update, 24 pgs.

Universal Serial Bus PS Interface White Paper, Editor Richard Wahler, Revision 1.00, Apr. 14, 2014, 19 pgs.

UM 10204 I2C-Bus Specification and User Manual, NXP, Rev. 5-9, Oct. 2012, 64 pgs.

Joosting, Qualcomm Quick Charge 2.0 Smartphone Charger Reference Design, EE Times, Europe, Oct. 21, 2013, 2 pgs.

Office Action for Chinese Application No. 201480080874.0, dated Jan. 22, 2019 (1 page).

\* cited by examiner

METHODS, ELECTRONIC DEVICES, AND CHARGER APPARATUS FOR QUICK USB CHARGING

REFERENCE TO RELATED APPLICATIONS

This application is a continuation of prior application Ser. No. 14/562,920, filed Dec. 8, 2014, currently pending; Which is a continuation of, and claims priority to and the benefit of, International Application No PCT/CN2014/083659, filed Aug. 5, 2014 and entitled "METHODS, ELECTRONIC DEVICES, AND CHARGER APPARATUS FOR QUICK USB CHARGING", the entirety of which is hereby incorporated by reference.

FIELD OF THE INVENTION

The present disclosure relates to USB charging circuitry and apparatus for interfacing electronic devices with charging equipment using USB cables.

BACKGROUND

Universal Serial Bus (USB) ports are commonly found on a variety of portable devices such as laptop computers, tablets, mobile phones, MP3 players, etc., and are also provided on desktop computers, automobile dashboard consoles, etc., to provide interconnection for serial communications between devices. In addition, the USB standards provide for charging capability by which mobile phones or other portable devices can be operated using power provided through a USB cable to the device. This power feature of the USB system also advantageously allows battery-powered devices to be charged using power provided from a connected USB-compatible device. Dedicated charging equipment is available, for example, having multiple USB ports for charging various portable devices, even where no serial communication is needed between the charging equipment and the device. The original USB implementations provided for charging at 5V with a charging current limited to 1 A, and subsequent revisions to the standards (e.g., USB 3.0, 3.1, etc.) provide for fast charging at higher levels such as using charger voltages of 5V, 12V, 20V and charging current levels of 1 A, 3 A and 5 A, thus accommodating up to 100 W charging. However, mismatching between USB charging sources and charged devices can lead to product damage and/or the inability to minimize charging time. Accordingly, there is a need for improved USB charger apparatus and electronic devices by which the charging power level can be maximized without damage to the charger or charged electronic device.

SUMMARY

The presently disclosed embodiments provide apparatus and techniques directed to better matching between the capabilities of USB chargers and charged electronic devices in automated fashion by establishing a bidirectional communications connection or link along the USB data lines of a USB cable between the charger and the device, through which the device detects the capabilities of the charger and finds a best match to its own capabilities, with the device sending programming or configuration information to the charger through the communications connection. By this technique, the device configures or programs the charger within the operational limits of both devices and may preferentially select the highest practicable charging level for fast charging. In various embodiments, moreover, the charger may report status indications such as overvoltage, overcurrent and/or overtemperature conditions of its power supply, with the device being able to reconfigure the charger to a lower charging level accordingly. The present disclosure thus provides significant advantages with respect to shortening charging times while mitigating charging/powering level mismatches and product damage, and without requiring user action.

In accordance with one or more aspects of the present disclosure, an electronic device is provided, comprising a USB connector, a load, and a controller coupled with conductive structures associated with first and second data signal conductors of the USB cable, where the controller is operative to establish a bidirectional digital communications connection with a connected charger. The device also includes a processor programmed to obtain charger capability information from the connected charger using the communications connection, and to selectively configure or reconfigure the connected charger via the communications connection at least partially according to the charger capability information.

In certain embodiments, the device processor is programmed to determine one or more matches between the charger capability information and device charging capability information representing charging power levels suitable for charging the electronic device, and the processor selectively configures or reconfigures the connected charger at least partially according to an identified match using the communications connection.

In certain embodiments, moreover, the electronic device receives charger status information from the connected charger via the communications connection, and the device processor selectively reconfigures the connected charger at least partially according to the charger status information via the communications connection. In certain disclosed embodiments, the processor is programmed to preferentially configure the charger according to a fastest charging match between the charger capability information and the device charging capability information. Moreover, the processor in certain embodiments is programmed to selectively reconfigure the connected charger using the communications connection to a slower charging match according to any received charger status information. In this manner, changing conditions at the charger, such as overvoltage, overcurrent and/or over temperature conditions can be used by the device processor for intelligent reconfiguration, for example, to reduce the charging level so as to mitigate or avoid charger malfunction or damage, while maintaining the possibility of the fastest possible charging in consideration of the charger conditions.

In certain embodiments, the electronic device includes a charger detection circuit providing a switching control signal having a first state indicating detected connection of the charger, and a second state indicating that no charger is connected to the electronic device. The device in these embodiments further includes a switching circuit to selectively couple the USB cable data lines with the controller when the switching control signal is in the first state and to decouple the USB data lines from the controller when the switching control signal is in the second state.

The device controller in certain embodiments implements an Inter-Integrated Circuit (I²C) bus via the USB data lines, with the device controller operating as a master controller using the first data line as a serial data line (SDA) and the second data line as a serial clock line (SCL). Further embodiments are possible in which the controller and the connected charger communicate using any suitable communications protocol, such as I²C, universal asynchronous receiver transmitter (UART), serial peripheral interface (SPI), etc.

A method is provided according to further aspects of the disclosure, for powering or charging an electronic device from a USB cable. The method includes using a processor to establish a bidirectional digital communications connection along first and second data signal conductors of the USB cable for exchanging data between the device and a connected charger, and obtaining charger capability information from the connected charger using the digital communications connection. The method further includes determining at least one match between the charger capability information and device charging capability information representing at least one charging power level suitable for charging the device, and selectively configuring the connected charger using the communications connection at least partially according to a fastest charging match between the charger capability information and the device charging capability information.

Certain embodiments of the method include using the processor to receive charger status information from the connected charger and selectively reconfiguring the connected charger using the communications connection to a slower charging match according to the charger status information.

Further aspects of the present disclosure provide a USB charger apparatus, which includes a connector with conductive structures for electrical connections to first and second data signal conductors and to first and second power conductors of the USB cable, as well as a power supply operative to supply electrical power at one of a plurality of output power levels to a connected electronic device. The charger apparatus also includes a controller providing charger capability information representing the plurality of output power levels to the connected electronic device using a bidirectional digital communications connection along the USB cable data signal conductors. The charger controller is further operative to receive configuration information from the connected electronic device using the communications connection, and to selectively set or adjust the power supply to one of the plurality of output power levels at least partially according to the configuration information.

In certain embodiments, the charger controller provides status information representing at least one condition of the power supply to the connected electronic device using the communications connection, where the status information in certain implementations represents an overvoltage condition, and overcurrent condition and/or and overtemperature condition of the power supply.

The controller in certain embodiments is operative as a slave controller, where the communications connection is an I²C bus connection using the USB cable data line conductors as a serial data line and a serial clock line.

In certain embodiments, the USB charger controller is operative to control the power supply to provide a default power output level for powering or charging the connected electronic device, and the controller selectively adjusts the output level of the power supply according to received configuration information from the connected electronic device.

DESCRIPTION OF THE VIEWS OF THE DRAWINGS

The following description and drawings set forth certain illustrative implementations of the disclosure in detail, which are indicative of several ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

One or more embodiments or implementations are hereinafter described in conjunction with the drawings, wherein like reference numerals are used to refer to like elements throughout, and wherein the various features are not necessarily drawn to scale.

Figure 1:
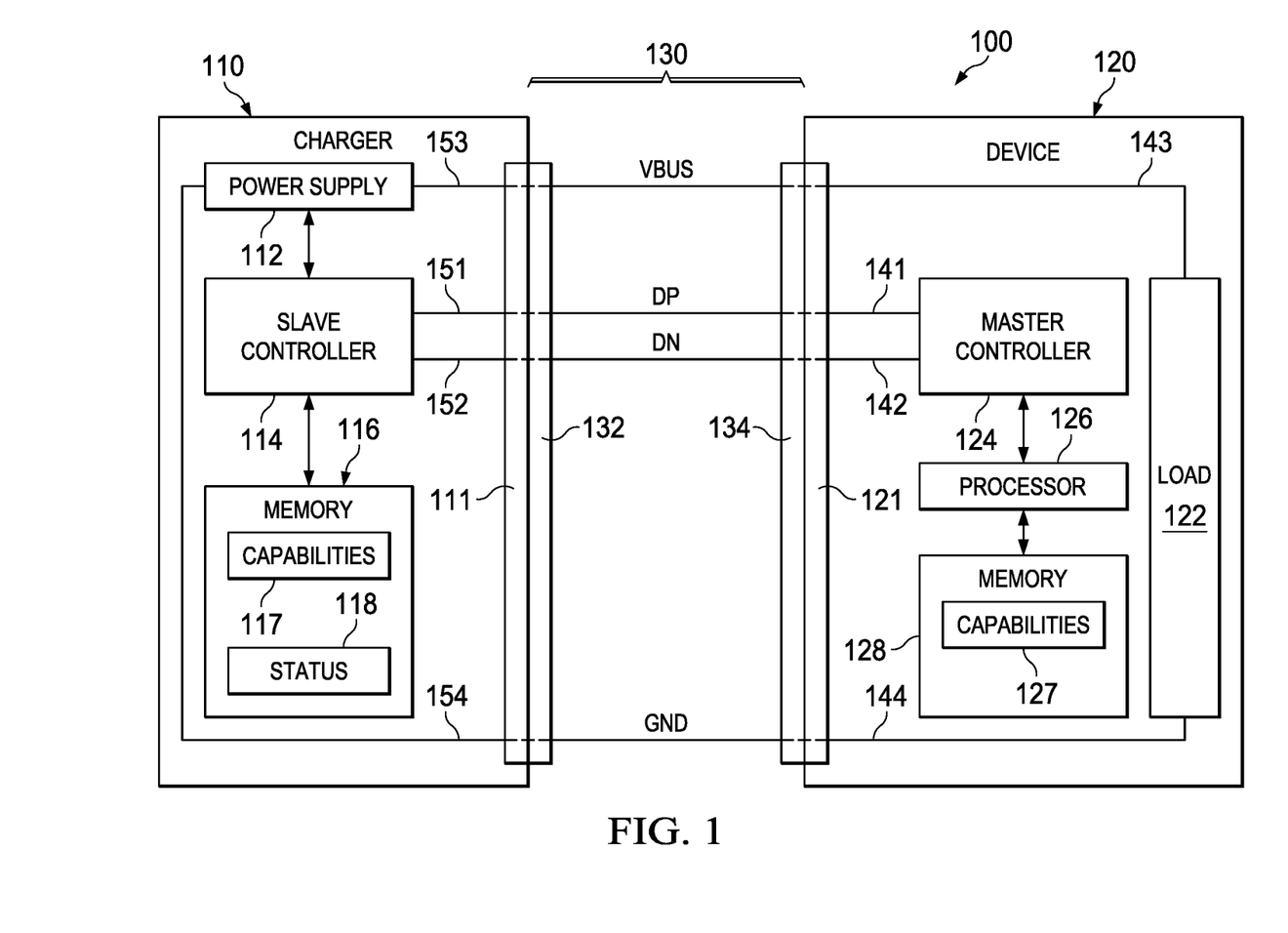
FIG. 1 is a schematic system diagram illustrating a USB charger and an electronic device connected by a USB cable for powering or charging the device, with the charger and device implementing a bidirectional communications connection for intelligent charger power level configuration according to one or more aspects of the present disclosure.

FIG. 1 shows a charging system 100 including a USB charger apparatus 110 and an electronic device 120 connected via a USB cable 130 for powering or charging the device 120 using power delivered from the charger 110 via the USB cable 130. The device 120 can be any electronic device, including without limitation a laptop computer, a tablet computer, a mobile phone, etc., having a load 122 which can receive electrical power from the charger 110 via the USB cable 130. The charger apparatus 110, moreover, can be a dedicated charging device, a desktop computer or any other device having a power supply 112 and a USB connector 111 operative to provide electrical power to a connected device 120 via the USB cable 130.

As seen in FIG. 1, the charger 110 includes a USB connector 111 which is adapted to receive a plug or receptacle 132 of the USB cable 130, and which provides conductive structures 151-154 for electrical connection to various conductors of the USB cable 130. In particular, a first conductive structure 151 provides electrical connection to a first data signal conductor of the USB cable 130, in this case a positive data signal conductor DP or D+, and a second conductive structure 152 provides electrical connection to a negative data signal conductor DN or D−, with third and fourth conductive structures 153 and 154 respectively providing electrical connection to first and second (e.g., positive and negative) power conductors VBUS and GND of the USB cable 130. The charger connector 111 can be any suitable connector configured to interface with a standard USB cable 130, for example, an A-type or a B-type USB cable plug or receptacle having any suitable number of connections according to relevant USB standards, where certain embodiments of the connector 111 can accommodate more than four connections, and can be adapted to receive or interface with a male connector 132 (plug) or a female connector (receptacle).

The charger apparatus 110 also includes a power supply 112 coupled to supply electrical power at one of a plurality of output power levels to a connected electronic device 120 via the third and fourth conductive structures 153 and 154. In one non-limiting example, the power supply 112 is programmable to supply output power at 5V, 12V or 20V, and may be capable of providing output current at 1 A, 3 A or 5 A. In other embodiments, the power supply 112 may implement other charging levels regarding voltage and current outputs, and may implement more or fewer combinations to provide two or more programmable output power levels.

The charger apparatus 110 further includes a controller 114 and a memory or data store 116 storing charger capability information 117 and status information 118. The controller 114 can be any suitable processor, control circuit, programmable logic, logic circuit, etc., and may include interface circuitry for sending and receiving digital data signals. The controller 114 is coupled with the conductive structures 151 and 152 and operates in certain embodiments as a slave controller to provide charger capability information 117 representing two or more output power levels to the connected electronic device 120 using a bidirectional digital communications connection established along the DP and DN conductors of the USB cable 130 via the conductive structures 151 and 152. In one possible implementation, for example, the slave controller 114 may be an electronic processor mounted on a printed circuit board, with the conductive structures 151 and 152 being implemented as conductive circuit board traces electrically connected between the slave controller 114 and the connector 111. One or more intervening components may be connected between the slave controller 114 and the connector 111, for example, such as filter circuit components, etc. In certain implementations, moreover, the bidirectional digital communications connection is an I$^2$C bus connection using the first conductive structure 151 as a serial data line (SDA) and the second conductive structure 152 as a serial clock line (SCL), with the controller 114 operating as a slave controller to exchange data with a master controller 124 of the device 120. Another possible embodiments, the charger controller 114 may operate as a master, such as in a multi-master system.

In operation, as explained further below, the charger controller 114 receives configuration information from the connected electronic device 120 using the bidirectional digital communications connection through the USB cable 130, and also selectively sets or adjusts the power supply 112 to one of the plurality of output power levels at least partially according to the configuration information. In addition, the illustrated charger apparatus 110 is also operative to provide status information 117 representing one or more power supply conditions to the connected electronic device 120 using the bidirectional digital communications connection, for example, to indicate a power supply overvoltage condition, overcurrent condition, and/or overtemperature condition. The charger 110, in this regard, may include suitable diagnostic circuitry, and the controller 114 may be implemented as a programmed processor operative to assess diagnostic information pertaining to the status or operating condition of the power supply 112 and may store corresponding status information 118 in the electronic memory 116.

This provided charger status information, in turn, can be used by the intelligent electronic device 120 to selectively choose a different desired power output level and accordingly send information via the communications connection to reconfigure the charger 110. In one possible embodiment, the controller 114 controls the power supply 112 to provide a default power output level, such as 5V and 1 A for powering or charging the device 120 and selectively adjusts the output level of the power supply 112 according to configuration information received from the connected electronic device 120 via the communications connection. Furthermore, the charger 110 in certain embodiments may be operable to modify or update the charger capability information 117 based on the status information 118 or based on other inputs, for example, to remove certain voltage or current capability indications from the capabilities information 117 if the diagnostic information indicates that the power supply 112 is no longer capable of providing certain voltage and/or current levels.

The electronic device 120 includes a USB connector 121 as well as a load 122, a controller 124, and a processor 126 with an associated electronic memory 128, and may include further circuitry such as a charger detection circuit 129 and a switching circuit as described further below in connection with FIG. 2. As seen in FIG. 1, the connector 121 is adapted for receiving a connector 134 (e.g., a plug or a receptacle) of the USB cable 130, and provides conductive structures 141-144 for electrical connection to the DP, DN, VBUS and GND conductors of the cable 130, respectively. The device 120 also includes a load 122 connected to the conductive structures 143 and 144, where the load 122 can be a power supply for operating various circuitry of the device 120, a chargeable battery system, or other electrical load in various embodiments.

The device controller 124 is coupled with the conductive structures 141 and 142 for communicating with a connected charger 110, and is selectively operative to establish a bidirectional digital communications connection for exchanging data with the connected charger 110 along the DP and DN conductors of the USB cable 130. The device controller 124 can be any suitable analog and/or digital circuitry, and may be programmable including a processor component, programmable logic, etc. in various embodiments. The processor 126 is operatively coupled with the controller 124, and is programmed to use the controller 124 in order to establish a bidirectional digital communications connection or link with a connected charger 110. In certain implementations, the processor 126 initiates communications connection establishment with the controller 124, or a connected charger 110 may initiate the communications connection establishment. Any suitable process can be implemented between the controllers 114, 124 of the charger 110 and the device 120 in order to establish a bidirectional communications link along the DP and DN lines.

Once the communications link is established, the processor 126 of the device 120 obtains charger capability information 117 from the connected charger 110 via the bidirectional digital communications connection established by the controller 124, and the processor selectively configures or reconfigures the connected charger 110 using the bidirectional digital communications connection along the DP and DN conductors. In one possible embodiment, the electronic device 120 sends a message through the communications link to the charger 110 requesting the charger capability information 117, and the controller 114 of the charger (operating as a slave) responds with a message including the requested capability information 117. In other possible embodiments, the charger 110 provides the charging capability information 117 without prompting by the device 120. Suitable message frames and communication protocols can be used by which the charger 110 provides the capability information 117 in a format recognizable by the device 120. To configure the charger 110 in one embodiment, the processor 126 of the device 120 constructs and transmits a message or messages to the charger 110 via the communications link along the DP and DN lines indicating a selected charging level recognizable by the charger 110 for configuring or programming the power supply 112 accordingly. A number of different embodiments are possible in which the controller 124 and the connected charger 110 communicate using any suitable communications protocol, including without limitation $I^2C$, universal asynchronous receiver transmitter (UART), serial peripheral interface (SPI), etc.

The configuration or reconfiguration is implemented by the processor 126 at least in part according to charger capability information 117 received from the charger 110. The memory 128 in this embodiment stores device charging capability information 127, which represents one or more suitable charging power levels at which power can safely be provided to the load 122. In operation according to one embodiment, the device processor 126 determines one or more matches between the charger capability information 117 received from the charger 110 and the device charging capability information 127 stored in the memory 128, and selectively configures or reconfigures the charger 110 using the bidirectional digital communications connection at least in part according to identified matches. In certain embodiments, the processor 126 may take into account other factors in determining what configuration information to send to the charger 110, for example such as charger status information received from the charger 110. The processor 126 is programmed to receive charger status information from the connected charger 110 using the bidirectional digital communications connection, and to selectively reconfigure 220 the connected charger 110 using the bidirectional digital communications connection at least partially according to the charger status information. In certain implementations, moreover, the device processor 126 preferentially configures the charger 110 via the communications connection according to a fastest charging match between the charger capability information 117 and the device charging capability information 127. For example, the charger 110 may, by default, begin charging operation at 5V, and report the capability of providing faster charging at 12V or 20V to the device 120. If the device 120 is capable of charging at one or both of these higher voltages, the device processor 126 may send a configuration message to the charger 110 to configure the charger power supply 112 to operate at 20V.

In addition, the device processor 126 in this embodiment may selectively reconfigure the connected charger 110 according to a slower charging match between the charger capability information 117 and the device charging capability information 127 based at least partially on any received charger status information 118. For example, if the slave controller 114 reports an overtemperature condition in the power supply 112, the device processor 126 may reconfigure the charger 110 by sending a reconfiguration message indicating a desired charging voltage level of 12V. In this example, the charger controller 114 may thereafter report clearance of the previously reported overtemperature condition, after which the device processor 126 may again reconfigure the charger 110 to resume operation at the higher power output level (e.g., 20V in this example).

In this manner, the electronic device 120 can intelligently facilitate safe operation of the charger 110 while expediting charging by preferentially choosing a highest power output level within the capabilities of both the charger 110 and the device 120, and selectively reducing the power output level (e.g., thereby slowing down the charging process) on an as-needed basis according to reported power supply status information 118 from the charger 110. This advantageous operation, moreover, is not possible using charging and device equipment incapable of communicating with one another, and is also not possible using simple unidirectional communications. Furthermore, usage of the USB data lines DP and DN to implement the bidirectional digital communications connection advantageously avoids or mitigates the need for excessive circuit modifications, wherein other approaches using the power supply connection (e.g., VBUS) for communications between the charger and the device require AC coupling circuitry to interface a transmitter and a receiver at either end of the USB cable 130. The concepts of the present disclosure, on the other hand, utilize the data signal conductors DP and DN to implement bidirectional communications thereby facilitating intelligent fast charging operation.

Figure 2:
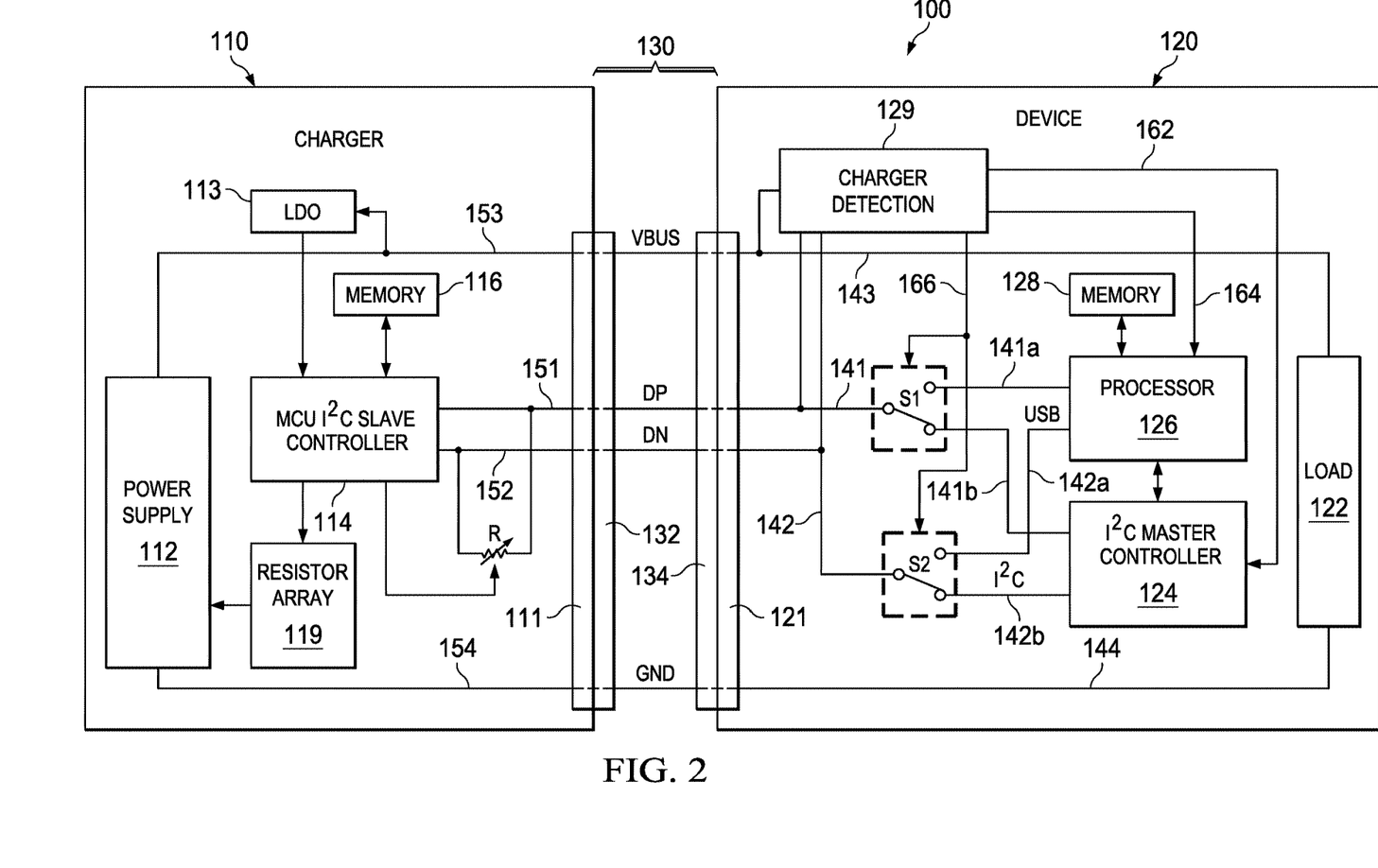
FIG. 2 is a schematic diagram illustrating an electronic device embodiment implementing an I²C master controller and a connected charger embodiment implementing an I²C slave controller for configuration of the charger through bidirectional digital communications.

FIG. 2 illustrates further details of an embodiment of a charger 110 and a device 120, in which an Inter-Integrated Circuit or $I^2C$ bus communications link is established, with the charger controller 114 implemented in a microcontroller unit (MCU) as a slave controller for the $I^2C$ communications, and with the device controller 124 operating as an $I^2C$ master controller. Other bidirectional digital communications links can be implemented using the DP and DN lines, including without limitation SPI, UART, etc. As seen in FIG. 2, the charger 110 in the $I^2C$ embodiment includes a low dropout (LDO) supply 113 providing power to the slave controller 114, and the controller 114 configures the charger power supply 112 by way of a resistor array 119 to provide an adjustable setpoint to the power supply 112. In addition, the charger 110 includes a variable resistor R connected between the data lines 151 and 152, where the controller 114 is configured to selectively modify the resistance value of the resistor R. Any suitable variable resistance circuitry can be used to implement the variable resistor R, such as a switching circuit for interconnecting various individual resistors in a series, parallel and/or a combination series/parallel configuration between the data lines 151 and 152. The resistance value may be used in certain embodiments to facilitate connection detection by the device 120 as described further below. In addition, the controller 114 is operatively coupled with the memory 116 which again stores the charger capabilities information 117 and may store charger status information 118 as described above. In other possible embodiments, any general-purpose I/O may be operatively coupled with the device controller 114 for providing the charger capability information 117 to the connected device 120 representing two or more output power levels that may be implemented by the power supply 112.

As further shown in FIG. 2, the device in this case includes a charger detection circuit 129 coupled with the data lines 141 and 142, where the detection circuit 129 provides a switching control signal 166 having a first state indicating that connection of the charger 110 has been detected, and a second state indicating that no charger 110 is connected to the device 120 via the USB connector 121. Any suitable detection circuitry 129 may be used in various embodiments, a non-limiting example of which is illustrated and described further below in connection with FIG. 4. The device 120 in the embodiment of FIG. 2 also includes a switching circuit with switches S1 and S2 coupled to receive the switching control signal 166 from the detection circuit 129. In this case, the switching circuit is operative to selectively couple the first and second conductive structures 141 and 142 with the communications controller 124 when the switching control signal 166 is in the first state (i.e., when a charger 110 is connected), and to selectively decouple the first and second conductive structures 141 and 142 from the controller 124 when the switching control signal 166 is in the second state (e.g., when no charger is connected).

Figure 3:
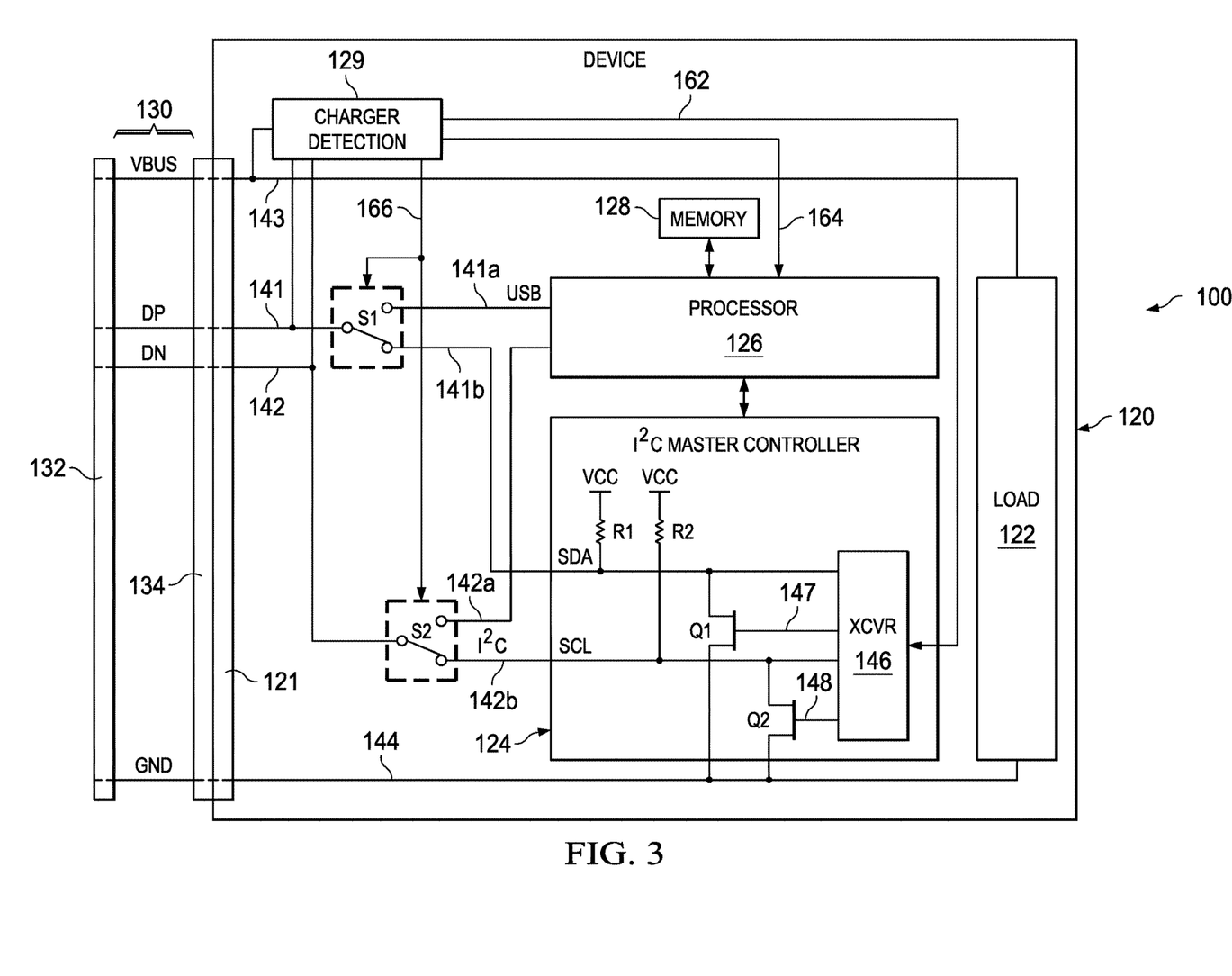
FIG. 3 is a schematic diagram illustrating further details of an electronic device including an I²C master controller with a transceiver and pull up resistors for a serial data line SDA and a serial clock line SCL to implement bidirectional digital communications connection with a connected charger.

Referring also to FIG. 3, a non-limiting example of an I²C master controller 124 is illustrated, including a transceiver 146 with an enable input receiving a control signal 162 from the charger detection circuit 129, by which the transceiver 146 is enabled when a connected charger 110 has been detected by the detection circuitry 129, and is disabled otherwise. In addition, the charger detection circuit 129 in this example provides a control signal 164 to the device processor 126, thereby notifying the processor 126 that a connected charger 110 has been detected. In this embodiment, the master controller 124 also includes pull-up resistors R1 and R2, with R1 being connected between the data line (SDA) and a positive supply voltage VCC, and with R2 being connected between the serial clock line SCL and VCC to accommodate interconnection of the transceiver 146 with an open drain I²C bus. The first switch S1 is operative according to the control signal 166 to connect the first conductive structure 141 (USB DP line) to either a first data connection 141a to the processor 126 (e.g., for normal USB communications) when no charger 110 is connected, or to an I²C bus SDA connection 141b coupled to the controller transceiver 146 (when a charger 110 is connected to the device 120) as shown. In addition, S2 similarly connects the second conductive structure 142 (USB DN line) to either a second data connection 142a to the processor 126 (when no charger 110 is connected), or to an I²C bus serial clock (SCL) connection 142b when a connected charger 110 has been detected by the detection circuitry 129.

The master controller 124 further includes a data transmit control transistor Q1 operated by the transceiver 146 for generating output data bits on the SDA line 141b according to a transmit control line 147 (TX), and a clock control transistor Q2 operated by a control line 148 from the transceiver 146 to provide a serial clock signal on the SCL line 142b. In operation of the illustrated embodiment, the device controller 124 is operative as a master controller to establish the bidirectional digital communications connection or link as an I²C bus, with the bidirectional digital communications connection using the first conductive structure 141 as a serial data line SDA and the second conductive structure 142 as a serial clock line SCL as shown. As previously mentioned, moreover, the charger controller 114 may be configured as a slave controller, or as a master controller, and may include suitable transceiver circuitry for sending and receiving data via the USB cable 130 according to any appropriate communications protocol.

Figure 4:
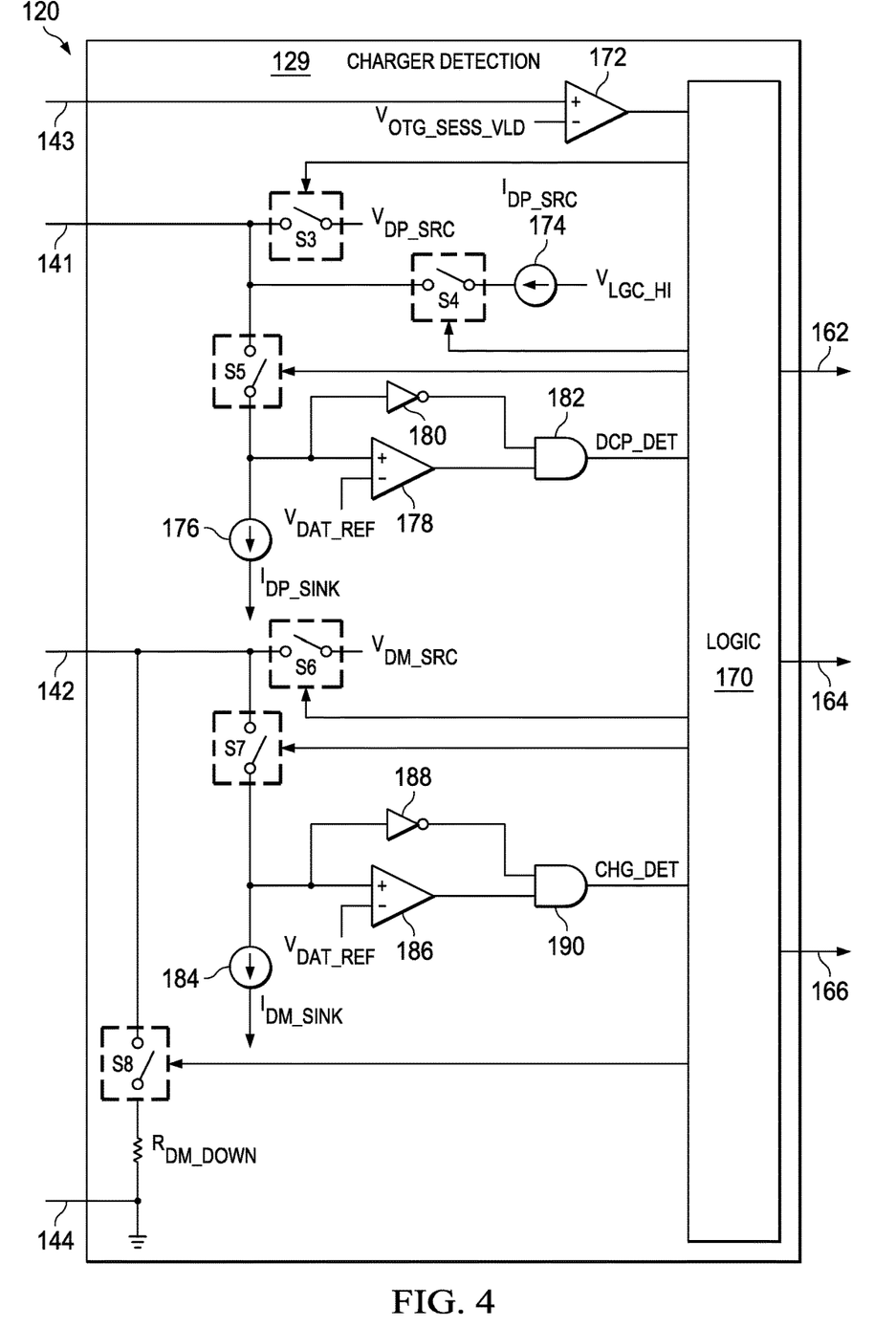
FIG. 4 is a schematic diagram illustrating a charger detection circuit embodiment in the electronic device of FIGS. 1-3.

One possible charger detection circuit embodiment 129 as illustrated in FIG. 4, including a logic circuit 170 providing the charger detection control signals 162, 164 and 166 as described above based on detection of a connected USB charger 110. In this embodiment, the charger detection circuit 129 is connected to the conductive structures 141-144, and includes a comparator 172 providing a signal to the logic circuit 170 based on comparison of the voltage at the connection 143 with a reference voltage $V_{OTG\_SESS\_VLD}$ indicating whether the VBUS line of a connected USB cable 130 has a positive voltage in excess of the reference. The first conductive structure 141 (DP line) is connected to switches S3-S5 controlled by the logic circuit 170. The switch S3 selectively connects a positive data source voltage reference $V_{DP\_SRC}$ to the DP line 141, and the switch S4 is operative according to the logic circuit 170 to selectively connect a current source 174 to provide a current $I_{DP\_SRC}$ to the DP line. In addition, the switch S5 selectively connects the line 141 with a current source 176 $I_{DP\_SINK}$ to conduct current from the line 141 to the circuit ground (conductive structure 144) and S5 also connects the line 141 with a comparator 178 comparing the voltage at the line 141 with a data reference voltage $V_{DAT\_REF}$. When the switch S5 is closed, the line 141 is also provided as an input to an inverter 180 whose output is provided along with the output of the comparator 178 as inputs to an AND gate 182 providing a dedicated charging port detection signal (DCP_DET) to the logic circuitry 170 as shown.

The second conductive structure 142 is connected to switches S6-S8 of the charger detection circuit 129 as shown in FIG. 4, with the switch S6 operative according to a signal from the logic circuit 170 to selectively connect the line 142 with a data source voltage reference $V_{DM\_SRC}$, and a switch S8 is selectively closed by the logic circuit 170 to connect the second data line (DN) to the ground line 144 through a pull-down resistor $R_{DM\_DWN}$. Also, the logic circuit 170 controls the switch S7 to selectively connect the line 142 with a current source 184 to conduct a sink current $I_{DM\_SINK}$ to ground, and to a comparator circuit including a comparator 186 comparing the voltage with the data reference voltage $V_{DAT\_REF}$, with the comparator output providing an input to an AND gate 190 along with the output of an inverter 188 to provide a charger detection signal CHG_DET to the logic 170 as shown.

The charger detection circuit 129 and the master controller 124 may be employed by the processor 126 according to conventional USB detection procedures to ascertain what type, if any, apparatuses connected to the device 120 via the USB cable 130 in certain embodiments. For example, the device 120 may implement Battery Charging Specification 1.2 primary detection or other suitable detection technique to distinguish between a standard downstream port (SDP), a charging downstream port (CDP), an accessory charger adapter (ACA) or a dedicated charging port (DCP). Primary detection may be implemented, for example, in which the logic circuit 170 turns on switches S3 and S7 to detect whether a DCP is connected, where USB charging standard provides that a connected DCP will short DP and DN through a resistance ($R_{DCP\_DAT}$, not shown), and the charger detection circuit 129 can thus detect a voltage on DN (via the comparator 186) that is close to $V_{DP\_SRC}$. The device 120 also compares the voltage at the DN line with the data reference voltage $V_{DAT\_REF}$, with S7 closed, and if the DN line voltage exceeds this reference, the logic circuit 170 determines that the device 120 is connected to either a DCP or a CDP. In this example, moreover, a connected CDP can be detected with the logic 170 closing the switches S3 and S5, and the comparator 178 comparing the voltage on the line 141 with the reference $V_{DAT\_REF}$ to selectively generate the signal DCP_DET. in this regard, certain implementations provide for selective establishment of the bidirectional digital communications connection or link using the DP and DN lines as discussed above if the electronic device 120 detects that a dedicated charging port 110 is connected.

Figure 5:
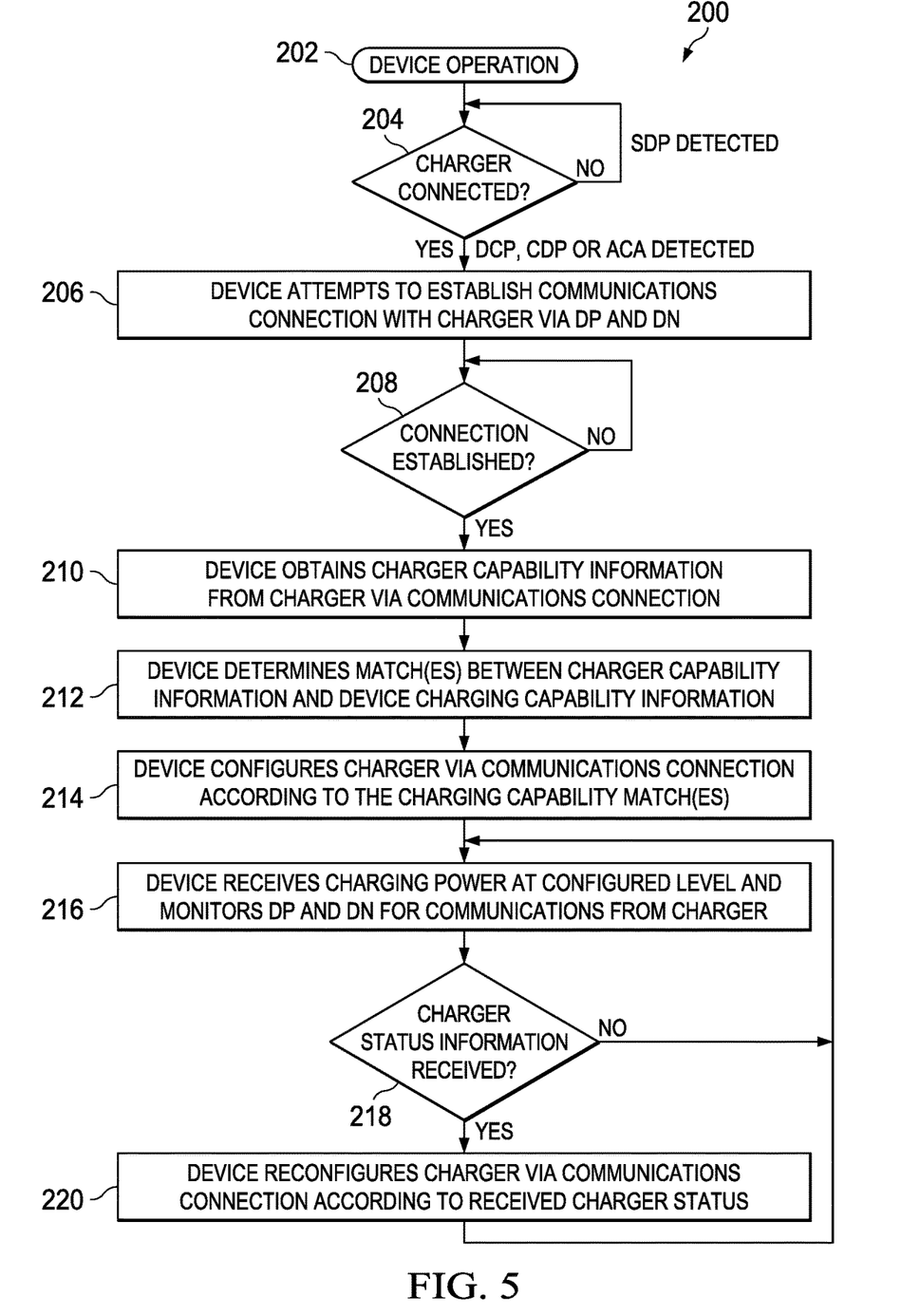
FIG. 5 is a flow diagram illustrating an embodiment of a device operating method for powering or charging the device from a USB cable.
Figure 6:
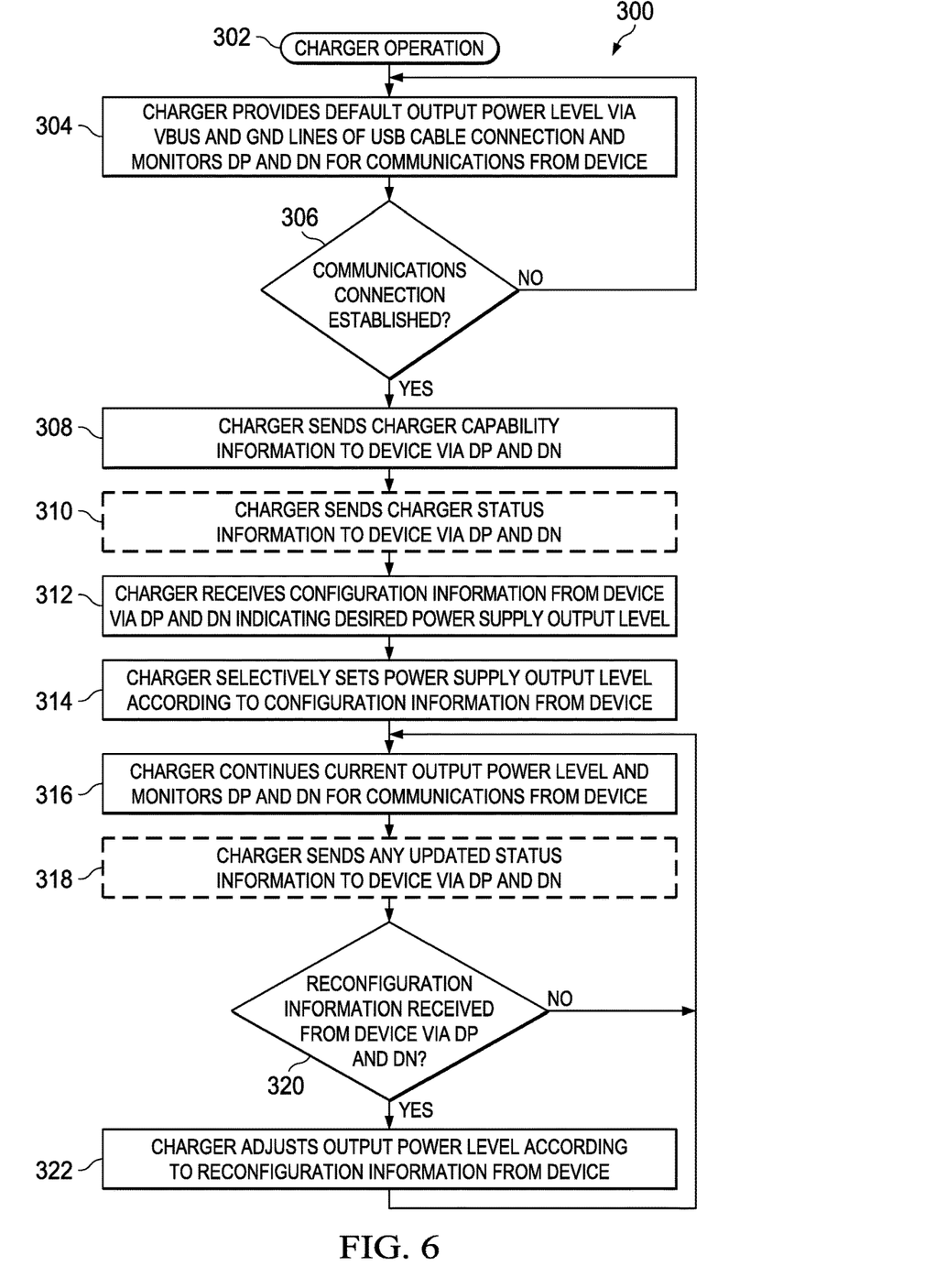
FIG. 6 is a flow diagram illustrating an embodiment of a charger apparatus operating method for powering or charging a connected device using a USB cable.

Referring also to FIGS. 5 and 6, FIG. 5 illustrates a process or method 200 for powering or charging an electronic device 120 from a USB cable 130. Although the method 200 in FIG. 5 and the method 300 of FIG. 6 are illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware as illustrated and described above, and/or using processor-executed software, processor-executed firmware, FPGAs, logic circuitry, etc. or combinations thereof, in order to provide the adaptive intelligent charging functionality described herein, although the present disclosure is not limited to the specifically illustrated or described applications and systems.

The process 200 in FIG. 5 illustrates operation of the electronic device 120 beginning at 202, with the device 120 determining or detecting at 204 whether a charger (e.g., a DCP charger and one embodiment) is connected. For example, the charger detection circuit 129 can be employed as described above with respect to FIG. 4 above to determine if a charger is connected. In the illustrated example if a SDP is connected, or if no device is connected to the USB connector 121 (NO at 204), the process continues at 204. Once a DCP, CDP or ACA is detected (YES at 204), the device 120 attempts to establish a bidirectional digital communications connection with the connected charger 110 via the DP and DN lines at 206. In the above-described embodiments, for example, the charger detection circuit 129 asserts the switching control signal 166 to operate the switching circuit S1, S2 to operatively couple the DP and DN lines with the I²C master controller 124 via the connections 141b and 142b as shown in FIGS. 2 and 3. As seen in FIG. 3, this provides pull-up resistors R1 and R2 between the DP and DN lines, respectively and VCC, thus using DP as an I²C serial data line SDA and DN as a serial clock line SCL. In this example, the master controller 124 issues a START condition indicating to the connected charger 110 that an address will be forthcoming. The master controller 124 then sends and ADDRESS corresponding to a predetermined address interpreted by the charger 110 as its own address, along with an indication that a Read operation is desired. In response, the connected charger (slave) controller 114 responds with an acknowledgment, and subsequently transmits data to the master controller 124, in this case the charger capability information 117 from the charger memory 116.

Once the acknowledgment has been received, the master controller 124 of the electronic device 120 determines that the bidirectional communications connection has been established (YES at 208 in FIG. 5), and receives the charger capability information via the communications connection at 210. The device processor 126 is provided with this charger capability information 117 from the controller 124, and compares the information 117 with the locally stored device charging capability information 127 from the memory 128, and determines at 212 one or more matches between the charger information 117 and the device information 127. At 214, the device processor 126 selectively configures the connected charger 110 using the bidirectional digital communications connection by transmitting the ADDRESS with an indication of a Write operation, followed by a configuration packet or frame indicating to the slave controller 114 the desired power supply output level selected by the connected device 120. As mentioned above, in certain embodiments, the device processor 126 preferentially selects the matching level corresponding to a fastest charging match between the charger capability information 117 and the device charging capability information 127, and transmits this to the slave controller 114 at 214 in FIG. 5. At 216, the device 120 receives charging power at the configured level and monitors the communications connection for any further information from the charger 110.

At 218, the device makes a determination as to whether any charger status information has been received (e.g., charger status information 118 in FIG. 1), for example, indicating an overvoltage, overcurrent and/or overtemperature or other condition in the charger power supply 112 in certain embodiments. If not (NO at 218 in FIG. 5), the process 200 continues at 218 with the device 120 receiving charging power at the previously configured output level. If charger status information 118 has been received from the charger 110 (YES at 218), the device 120 selectively reconfigures the charger 110 via the communications connection according to the received charger status at 220, and the process returns to charging operation at 216 with the device controller 124 continuing to monitor the DP and DN lines. In certain implementations, as discussed above, the device processor 126 selectively reconfigures the charging level at 220 to slow the charging process, for example, once an overcurrent, overvoltage and/or overtemperature condition has been indicated by the charger 110 at 218.

Referring also to FIG. 6, a process 300 is illustrated for charger operation beginning at 302, with the charger providing a default level of output power (e.g., 5V at 1 A) via VBUS and GND at 304 while monitoring the DP and DN lines for communications from a connected electronic device 120. A determination is made at 306 as to whether a communications connection has been established, and if not (NO), the charger 110 continues to provide the default voltage and current levels for charging the connected device 120. Once a communications connection has been established (YES at 306), the charger 110 sends charger capability information 117 at 308 to the connected device 120 via the DP and DN lines, and may optionally send charger status information 118 (if available) to the device 120 at 310.

At 312, the charger 110 receives configuration information from the device 120 using the communications connection, with the configuration information indicating a desired power supply output level (e.g., 20V at 1 A). At 314, the charger controller 114 selectively sets the output level of the power supply 112 according to the received configuration information, and thereafter provides that output level at 316 while again monitoring the DP and DN lines for further communications from the connected device 120. In certain embodiments, the charger 110 may also send any updated status information 118 to the device 120 via the communications connection at 318, for example, upon detection of a predetermined condition in the charger power supply 112 (e.g., overvoltage, overcurrent and/or overtemperature in one embodiment).

At 320, the charger 110 determines whether any reconfiguration information has been received via the DP and DN connections, and otherwise (NO at 320) the process continues at 316 with the charger 110 maintaining the output at the present level while monitoring the DP and DN lines for messages from the connected device 110 and sending any updated status information 118 at 318. If reconfiguration information is received from the device 120 (YES at 320), the charger 110 selectively adjusts the output power level according to the reconfiguration information at 322, and the process 300 returns to 316 as described above.

The presently disclosed embodiments advantageously reuse DP and DN connections of the USB cable 130 to provide a bidirectional communications bus, with general purpose or other data storage on the connected charger 110 storing charger capability information 117 for transmission to a connected electronic device 120, allowing intelligent match determination and charging speed determination by the device 120 based on the actual capabilities of the charger 110 and the device 120. Moreover, the disclosed techniques facilitate updating the charger output level under control of the connected device 120 by providing power supply status information 118 from the charger 110, thereby facilitating adaptive adjustments to mitigate product damage and facilitate shortened charging times. The disclosed apparatus and techniques thus present a significant advance over dedicated charging apparatus subject to user mismatching, with the disclosed device 120 and charger 110 intelligently using capability information, supplemented with charger status information, to facilitate fast charging while mitigating component damage or stress in an automated fashion, and without the additional circuitry associated with analog interdevice communication adaptations while maintaining USB compatibility and standard compliance across multiple devices and chargers.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. An electronic device, comprising:
   a universal serial bus (USB) connector having a VBUS conductor, a DP conductor, a DN conductor, and a GND conductor;
   a load coupled to the VBUS conductor and the GND conductor;
   charger detection circuitry coupled to the VBUS conductor, the DP conductor and the DN conductor, the charger detection circuitry having first, second and third control outputs;
   a processor having a DP connection coupled to the DP conductor and a DN connection coupled to the DN conductor for USB communications, and a control input coupled to the first control output;
   a controller having a first connection coupled to the DP conductor, a second connection coupled to the DN conductor, a third connection coupled to the processor, and a control input coupled to the second control output, the controller including bidirectional digital communication circuitry coupled to the first connection and the second connection for I2C communications; and
   switching circuitry coupled to the DP and DN conductors, coupled to the first and second connections, coupled to the DP and DN connections, and having a control input coupled to the third control output.

2. The electronic device of claim 1 in which the controller is an I2C controller and includes an I2C digital transceiver having a first input connected to the first connection, a second input connected to the second connection input.

3. The electronic device of claim 1 in which the first connection is a serial data line, the second connection is a serial clock line, and the controller includes a first resistor coupled between a positive supply voltage and the serial data line, a second resistor coupled between the positive supply voltage and the serial clock line, a first transistor coupled between the serial data line and a circuit ground, and a second transistor coupled between the serial clock line and the circuit ground.

4. The electronic device of claim 1 in which the load is a power supply for operating the device.

5. The electronic device of claim 1 in which the load is a chargeable battery system.

6. The electronic device of claim 1 including a memory coupled to the processor for storing charging capability information.

7. The electronic device of claim 1 in which the bidirectional communication circuitry coupled to the first connection and the second connection is for charger capability information communications.

8. A process of charging a universal serial bus device having a connector with a VBUS conductor, a DP conductor, a DN conductor, and a GND conductor, the process comprising:
   (a) determining that a charger is connected to the connector using a charger detection circuit coupled to the VBUS conductor by comparing a voltage at the DN conductor with a reference voltage, the charger detection circuit including switching circuitry coupled to the DP and DN conductors;
   (b) responsive to the voltage at the DN conductor being greater than the reference voltage, establishing a bidirectional I$^2$C digital communications connection between the connected charger and a communications controller coupled to the DP and DN conductors, wherein the DP conductor is coupled to a serial data line and the DN conductor is coupled to a serial clock line;
   (c) transmitting and receiving digital data between the charger and the communications controller on the DP and DN conductors, wherein the digital data includes charger capability information from the charger and voltage and current supply information of the device;
   (d) configuring the charger with a charging capability matching a charging capability of the device; and
   (e) receiving power on the connector at the configured charging capability from the charger.

9. The process of claim 8 including:
   (a) monitoring the DN and DP connectors for communication of status change information from the charger; and
   (b) reconfiguring the charger according to any received status change information from the charger.

10. The process of claim 8 in which exchanging data includes receiving charger capability information from the charger, reading charging capability information from a memory, and sending configuration information to the charger.

11. The process of claim 8 in which the exchanging data includes receiving messages in a processor over the bidirectional digital communications connection through the communications controller and sending messages from the processor over the bidirectional digital communications connection through the communications controller.

12. A Universal Serial Bus (USB) charger apparatus, comprising:
   a USB connector including a VBUS conductor, a DP conductor, a DN conductor, and a GND conductor;
   a power supply coupled to the VBUS conductor and the GND conductor, and having a resistor array input;
   an I2C slave controller having a serial data line coupled to the DP conductor, a serial clock line coupled to the DN conductor, and a resistor array control output, the controller including bidirectional digital communication circuitry for communicating over the DP and DN conductors;
   a resistor array having a resistor array control input coupled to the resistor array control output, and a resistor array output coupled to the resistor array input of the power supply; and
   a memory coupled to the controller and configured to store charger capability information.

13. The USB charger apparatus of claim 12 in which the controller includes a variable resistor control output and including a variable resistor coupled between the DP conductor and the DN conductor and having a control input connected to the variable resistor control output.

14. The USB charger apparatus of claim 12 including a low drop out supply connected to the VBUS conductor and having a supply lead connected to the controller.

15. A process of charging a universal serial bus device having a connector with a VBUS conductor, a DP conductor, a DN conductor, and a GND conductor, the process comprising:
   (a) connecting a charger to the device via the connector;
   (b) providing a default level of output power from a power supply in the charger to the device via the VBUS conductor and the GND conductor;
   (c) establishing a bidirectional digital communications connection between a communications controller in the charger and the device via the DP and DN conductors;
   (d) sending charger capability information to the device via the DP and DN conductors;
   (e) receiving configuration information from the device in the charger via the bidirectional digital communications connection on the DP and DN conductors including voltage and current supply information;
   (f) configuring the charging capability of the charger to match the configuration information; and
   (g) sending charging power on the connector at the configured charging capability from the charger to the device.

16. The process of claim 15 including:
   (a) monitoring the DN and DP connectors for any communication of status changes from the device; and
   (b) reconfiguring the charger according to any received status changes from the device.

17. The process of claim 15 in which the establishing includes establishing an I$^2$C bidirectional digital communications connection.

18. The process of claim 15 in which the sending charger capability information to the device includes sending voltage and current supply information.

* * * * *